United States Patent [19]

Heinz et al.

[11] Patent Number: 5,264,479

[45] Date of Patent: Nov. 23, 1993

[54] LACTAM MELTS HAVING INCREASED VISCOSITY AND THEIR USE

[75] Inventors: Hans-Detlef Heinz; Friedrich Fahnler, both of Krefeld, Fed. Rep. of Germany

[73] Assignee: Bayer Aktiengesellschaft, Leverkusen, Fed. Rep. of Germany

[21] Appl. No.: 49,640

[22] Filed: Apr. 20, 1993

Related U.S. Application Data

[63] Continuation of Ser. No. 698,974, May 13, 1991, abandoned.

[30] Foreign Application Priority Data

May 26, 1990 [DE] Fed. Rep. of Germany ....... 4016995
Dec. 22, 1990 [DE] Fed. Rep. of Germany ....... 4041522

[51] Int. Cl.⁵ .................. C08F 212/34; C07D 223/10; C07D 225/02
[52] U.S. Cl. .................... 524/505; 540/451; 540/485; 524/474; 525/95; 525/98
[58] Field of Search ................. 540/451, 485; 525/95, 525/98; 524/505

[56] References Cited

U.S. PATENT DOCUMENTS 4,242,270 12/1986 Gergen et al. ............... 525/92

FOREIGN PATENT DOCUMENTS 0121606 10/1984 European Pat. Off. ............ 525/92
2465765 3/1981 France ........................... 525/92

*Primary Examiner*—Robert T. Bond
*Attorney, Agent, or Firm*—Connolly & Hutz

[57] ABSTRACT

The invention relates to lactam mixtures which give lactam melts having increased viscosity, to their production and to their use, preferably in the activated anionic polymerization of lactams (to cast polyamides). According to the invention, certain unsaturated aromatic vinyl compound/diene block copolymers (B) which dissolve in the lactam melt are added to the lactam (melt)s (A) in quantities of 1 to 15% by weight, a component (C) which is compatible with the diene block copolymers (B) and which dissolves completely or partly in the lactam melt optionally being added as an additional component. The block copolymers (B) used contain 10 to 85% by weight aromatic vinyl units and 15 to 90% by weight diene units. The block copolymers (B) may even be partly hydrogenated, epoxidized or grafted.

The preferred lactam is ε-caprolactam.

Lactam melts of increased viscosity are particularly suitable for taking up reinforcing materials and fillers (D) and for the production of filled cast polyamides.

The invention also relates to the use of lactam melts thus thickened, more particularly lactam melts containing fillers/reinforcing materials, in a process for the production of polyamides and also to corresponding polyamide moldings, more particularly by the anionically activated casting process.

20 Claims, No Drawings

LACTAM MELTS HAVING INCREASED VISCOSITY AND THEIR USE

This application is a continuation of application Ser. No. 07/698,974 filed May 13, 1991, now abandoned.

This invention relates to lactam mixtures which give lactam melts having increased viscosity, to their production and to their use, preferably in the activated anionic polymerization of lactams (to cast polyamides). According to the invention, certain unsaturated aromatic vinyl compound/diene block copolymers (B) which dissolve in the lactam melt are added to the lactam (melt)s (A) in quantities of 1 to 15% by weight, a component (C) which is compatible with the diene block copolymers (B) and which dissolves completely or partly in the lactam melt optionally being added as an additional component. The block copolymers (B) used contain 10 to 85% by weight aromatic vinyl units and 15 to 90% by weight diene units. The block copolymers (B) may even be partly hydrogenated, epoxidized or grafted.

The preferred lactam is ε-caprolactam.

Lactam melts of increased viscosity are particularly suitable for taking up reinforcing materials and fillers (D) and for the production of filled cast polyamides.

The present invention also relates to the use of lactam melts thus thickened, more particularly lactam melts containing fillers/reinforcing materials, in a process for the production of polyamides and also to corresponding polyamide moldings, more particularly by the anionically activated casting process.

Cast polyamide moldings produced, for example, from caprolactam are known to show a high level of mechanical properties. On account of their increased crystallinity by comparison with standard injection-molded parts and their considerably higher molecular weights, almost all mechanical properties are improved by comparison with polyamides produced by polycondensation. For this reason, cast polyamide is an attractive material. However, a disadvantage of cast polyamide in relation to polyamides produced by polycondensation is that cast polyamide generally cannot be processed like a thermoplastic. Accordingly, all the additives which are to be present in the molding generally have to be introduced into the lactam melt before polymerization.

The production of cast polyamide moldings from low-viscosity lactam melts and catalysts and also activators (activated anionic polymerization) is known (cf. for example Vieweg, Müller; Kunststoff-Handbuch, Vol. VI, Carl-Hanser-Verlag, München 1966). Compared with polyurethane RIM systems, processing is simpler because the lactam melts, for example by virtue of their very low viscosity, can be transported in the absence of pressure using simple pumps or even by reaction injection molding (under pressure).

Now, for many applications, it would be desirable further to improve the favorable mechanical properties of cast polyamide moldings, for example their hardness, stiffness and strength and, above all, their creep modulus, by addition of reinforcing materials and fillers, as known from injection molding materials. However, it is precisely in this regard that the low viscosity of the lactam melts is a considerable disadvantage because glass fibers, for example, sediment very quickly on account of the difference in density. This makes it very difficult to produce a glass-fiber-reinforced cast polyamide by conventional methods. Accordingly, it would be desirable if the viscosity of lactam melts could be distinctly increased in a simple manner.

However, a problem in this regard is that the activated anionic polymerization of lactams represents a chemically very sensitive system which is affected by most additives. In general, typical thickeners, such as polyacrylamide, either disturb the polymerization reaction or show inadequate solubility in the lactam melts.

It has now surprisingly been found that the viscosity of lactam melts can be distinctly increased by addition of special unsaturated aromatic vinyl compound/diene block copolymers (B) and, optionally, an additional component (C) miscible with the diene blocks and that the activated anionic polymerization is generally affected to only an insignificant extent, if at all, by this measure. It has also been found that these lactam mixtures are very suitable for the production of reinforced and filled cast polyamide moldings because the fillers/reinforcing materials (D) either do not sediment in the melt at all or only sediment so slowly that they are homogeneously distributed in the moldings.

Accordingly, the present invention relates to lactam mixtures having increased melt viscosity, characterized in that they contain A) ω-lactams (cyclic amides), more particularly ε-caprolactam, B) 1 to 15% by weight, preferably 3 to 12% by weight and more preferably 4 to 10% by weight aromatic vinyl compound/diene block copolymers (B) containing 10 to 85% by weight, preferably 20 to 80% by weight and more preferably 30 to 55% by weight aromatic vinyl units and 15 to 90% by weight, preferably 20 to 80% by weight and more preferably 45 to 70% by weight diene units, the block copolymers (B) optionally being modified by partial hydrogenation of the soft diene segments up to a degree of hydrogenation of 60% and/or by grafting with reactive monomers and/or other modifying agents and optionally being present in dissolved form, and optionally C) 0 to 20% by weight and preferably 0.1 to 20% by weight of substances compatible with diene blocks and D) 0 to 50% by weight and more preferably 0 to 40% by weight, based on (A+B+C), of fillers and reinforcing materials and optionally typical additives.

These thickened lactam melts preferably contain fillers and/or reinforcing materials in the usual quantities, for example of 5 to 50% by weight and preferably up to 40% by weight.

The present invention also relates to the use of lactam mixtures according to the invention which give thickened lactam melts for the production of polyamides, more particularly by activated anionic polymerization, and more particularly for the production of reinforced and/or filled cast polyamide moldings. The present invention also relates to a process for the production of these polyamides and to the use of the polyamides or rather polyamide moldings produced by using the lactam melts according to the invention.

According to the invention, suitable aromatic vinyl compound/diene block copolymers (B) include those containing unmodified blocks and those containing subsequently modified blocks, for example those in which some of the diene blocks (at most up to 60% and preferably up to <50%) are hydrogenated or modified by grafting.

Preferred monomers for the aromatic vinyl blocks are styrene, α-methyl styrene, m- and p-methyl styrene (or the mixture thereof known as "vinyl toluene") and also 2- and 4-vinyl pyridine. Preferred monomers for the synthesis of the diene blocks are butadiene, isoprene and 2,3-dimethyl butadiene. Styrene, α-methyl styrene, m- and p-methyl styrene, butadiene and isoprene are particularly preferred. Styrene and butadiene are most particularly preferred.

The aromatic vinyl blocks and diene blocks (or, for example, partly hydrogenated diene blocks) may be put together in different ways to form block copolymers. According to the invention, suitable block copolymers are, for example, A'B' two-block copolymers, A'B'A' or B'A'B' three-block copolymers, (A'B')$_n$ multiblock copolymers and others, A' and B' representing the blocks in the block copolymers B). The block copolymers (B) suitable for use in accordance with the invention may even have a star-like structure, for example by coupling with SiCl$_4$ after anionic polymerization. The block copolymers may even have mixed blocks between the individual aromatic vinyl blocks and diene blocks ("tapered" or "overlap" structures). The individual blocks may even be branched. The diene blocks may even be subsequently chemically modified, for example by partial hydrogenation (up to 60%) and/or by grafting with reactive monomers, for example with unsaturated carboxylic acids, maleic anhydride, maleic semiesters or maleic imides, or even by epoxidation, as known in the prior art.

Suitable block copolymers are, for example, styrene/butadiene two-block copolymers, styrene/isoprene two-block copolymers, styrene/butadiene/styrene three-block copolymers, styrene/isoprene/styrene three-block copolymers, styrene/butadiene multiblock copolymers, styrene/isoprene multiblock copolymers, maleic-anhydride-grafted (or carboxylated), partly hydrogenated or non-hydrogenated styrene/butadiene/styrene three-block copolymers, epoxidized styrene/butadiene/styrene three-block copolymers and others. The block copolymers mentioned belong to the block copolymers preferably used in accordance with the invention. Particularly preferred block copolymers are two-block copolymers, such as styrene/butadiene two-block copolymers.

Suitable block copolymers are commercially available, for example, under the names Solprene ®, Kraton ® D, Cariflex ®, Tufprene ® TR and Buna BL ®.

The block copolymers (B) should contain 10 to 85% by weight aromatic vinyl (VA) units and 90 to 15% by weight diene units (DJ), preferably 20 to 80% by weight (VA) and 80 to 20% by weight (DJ) and, more preferably, 30 to 55% by weight (VA) and 70 to 45% by weight (DJ). The block copolymers may also contain typical additives, for example stabilizers.

The block copolymers should be used in quantities of 1 to 15% by weight for the production of the lactam mixtures (melts) according to the invention.

In principle, any low molecular weight and high molecular weight substances which are homogeneously miscible with, or form homogeneous mixtures or solutions with, polydienes may be used as the components C) compatible or miscible with the diene blocks. Examples of such components are aliphatic and aromatic hydrocarbons, such as polybutadiene (oil)s, hydroxyl- and phenyl-terminated polybutadiene (oil)s, polyethylene waxes, poly-α-olefin (oil)s, polyisoprene (oil)s, polyoctylene (oil)s mineral oils or lubricants based on aliphatic, aromatic and cycloaliphatic hydrocarbons, polyethers soluble in mineral oils, alkyl-modified polyethers, silicone (oil)s, ligroins, natural or synthetic waxes and others.

The above-described components C) may be soluble or even insoluble in caprolactam on its own. Preferred components of this type have (average) molecular weights ($\overline{M}_n$) of at least 200 g/mol, preferably at least 300 g/mol and, more preferably, at least 500 g/mol and, where they are volatile, boiling points of at least 200° C., preferably of at least 250° C. and more preferably of at least 300° C. In addition, the melting/softening points of the preferred additional components C) are no higher than 150 and, more particularly, no higher than 100° C. The most particularly preferred components C) have melting points of at most 60° C. and, more particularly, are liquid at temperatures of 20° to 60° C.

The components C) mentioned are added, if desired, in quantities of up to 20% by weight, preferably in quantities of 0.5 to 12% by weight and, more preferably, in quantities of 1 to 10% by weight, based on the final lactam mixture.

The described components C) in combination with the block copolymers B) can lead to higher viscosity values and to a lower dependence of viscosity on temperature, depending on the dissolving conditions.

Preferred lactam melts/mixtures according to the invention show a viscosity/temperature anomaly, i.e. in a certain temperature range (typically around 110° to 180° C. in the present case), their viscosity increases with increasing temperature rather than decreasing in the normal way. In this regard, they generally show pronounced pseudo-plasticity.

The thickeners B) or thickener combinations (B+C) are added in such a quantity that the viscosity of the final mixture (at 150° C./approx. 20 s$^{-1}$ is in the range from 10 to 2,000, preferably 50 to 1,500 and, more preferably, 100 to 1,000 mPa.s without the fillers/reinforcing materials D). Viscosities of at least about 50 mPa.s are generally sufficient, depending on type and quantity, for obtaining a sufficiently stable dispersion of the fillers and reinforcing materials, for example glass fibers. On the other hand, the viscosity of the lactam melt (without fillers/reinforcing materials) should preferably be no higher than about 1,500 mPa.s and, more preferably, 1,000 mPa.s because otherwise processability might be adversely affected.

The thickener combination (B+C) is preferably present in dissolved form in the lactam melt. In the context of the invention, this means that the melt is clear or slightly opaque in appearance. Any insoluble components present should preferably make up no more than at most 5%.

Suitable ω-lactams A) are lactams containing at least 4 carbon atoms (4, 6–12 carbon atoms in the ring). Preferred lactams are ε-caprolactam and ω-lauric lactam, ε-caprolactam being particularly preferred. The lactams may also be used in the form of a mixture.

The lactam mixtures/melts according to the invention may be prepared, for example, by mixing and melting the lactams A) with the pure components B), C) or by mixing the pure components B) and C) or solutions thereof in volatile solvents with molten lactams (with optionally subsequent removal of the solvent). It is even possible to use concentrates (master batches) of components B) and C), for example in caprolactam, or even oil-extended block copolymers. The thickener (combinations) are preferably added to the molten lactam.

In addition to the thickeners B) or thickener combinations (B+C) to be used in accordance with the invention and the fillers and reinforcing materials D) optionally present, the melt may also contain other typical additives, such as (optionally functionalized) rubbers or functionalized soft segments incorporable in polyamides, such as for example polyethers, polydienes, etc., of the type described in the prior art for polyamides. Functionalized soft segments (for example NH$_2$ groups) may be chemically incorporated in the PA, for example as blocks. Corresponding soft segments and processes for incorporating them in PA, for example by coupling to the activator, are known in large numbers. For example, amine-containing soft segments, for example polyethers, may be reacted with polyisocyanates to form isocyanate-terminated soft segments which then represent a polymeric activator or OH-terminated polyethers may be reacted with dicarboxylic acid dichlorides, for example terephthalic acid dichloride, to form acid-chloride-terminated polyethers and then with a lactam to form a polymeric activator.

Depending on the nature of the elastomer segment or the terminal groups and on the method of attachment to the activator, the choice of the catalyst may be restricted, for example when the catalyst degrades the elastomer segment. Corresponding optimal combinations are preferably used in accordance with the invention.

In principle, any polymers readily dissolving in the particular lactam at approximately 140° C. are suitable thickeners for lactam melts. However, the choice is drastically restricted because the activated anionic polymerization of lactams is a chemically very sensitive system that is capable of reacting with a number of structures, particularly H-acidic compounds, which is reflected in polymerization disturbances. The surprising observation was that the thickener B) or thickener combination B)+C) to be used in accordance with the invention generally causes relatively minor, if any, polymerization disturbances (the extent of any polymerization disturbances may depend upon the particular catalyst/activator system used) and show good viscosity-generating power and also very good solubility. Accordingly, the thickener combination to be used in accordance with the invention represents a particularly suitable thickener system. The viscosity level reached may depend upon the dissolving conditions. A preferred dissolving program consists of a) 1 h at 140° C. followed by b) a few minutes to 1 h at 150° C.

In principle, suitable fillers and reinforcing materials D) (up to 60% by weight and preferably 5 to 40% by weight) are any of the types typically used, although they may not all be equally suitable, depending on the composition of the size. Examples of fillers/reinforcing materials suitable for use in accordance with the invention in the production of the reinforced/filled cast polyamide moldings are glass fibers, glass beads, mineral fillers, carbon fibers, aramide fibers and others of the type widely used in the prior art. In many cases, they have been coated with certain sizes (for example with PU dispersions) or have been correspondingly pretreated, for example silanized.

In addition, any of the additives typically used in the prior art, including for example mold release agents, UV stabilizers, antioxidants, lubricants (for example MoS$_2$), other polymeric (optionally chemically coupled) blending components and others, may also be present as additives E).

The (optionally reinforced and/or filled) cast polyamide moldings according to the invention are produced in principle by standard methods, but preferably by activated anionic polymerization of lactams.

In principle, any catalysts known for the activated anionic polymerization of lactams may be used, including for example the sodium salts of caprolactam and pyrrolidone, sodium hydride, sodium methanolate, caprolactam magnesium bromide and iodide.

In principle, any known activators may be used, including for example isocyanates, acid chlorides, anhydrides, carbodiimides, reaction products of these compounds with lactams and others, as generally known from the prior art.

Preferred catalysts are the sodium salts of caprolactam and pyrrolidone and also caprolactam magnesium bromide and iodide.

Preferred activators are isocyanates and acid chlorides and the respective reaction products with lactams.

The lactam melts according to the invention are preferably used for the production of cast polyamide moldings (end products, semi-finished products and the like), being particularly suitable for reinforced/filled types. Pressureless processes or processes carried out under pressure (for example reaction injection molding) may be used; they may be carried out in open or closed molds using typical, known mold temperatures, heating times, casting times and mold release agents, flow aids and foam inhibitors. One particular advantage of the lactam melts according to the invention is that suspended fillers or reinforcing materials show considerably better suspension stability.

The lactam melts according to the invention may also be used for the production of polyamides by hydrolytic polymerization, although their particular effect is in activated anionic polymerization.

When used for the production of cast polyamides, the lactam melts according to the invention have viscosities of preferably at least 50 mPa.s, more preferably of at least 100 mPa.s and, most preferably, of at least 150 mPa.s (as measured with a rotational viscosimeter) at 150° C./20 s$^{-1}$.

The following Examples with typical starting materials in typical quantities are intended to illustrate the invention without limiting it in any way.

Unless otherwise stated, a Haake Viskotester (shear rate approx. 20–30 s$^{-1}$: rapid rotational stage) was used for measuring viscosity.

"Component C)" are the substances compatible with the diene blocks which are optionally present in addition to the block copolymers.

Examples

Examples 1 to 4

$\epsilon$-Caprolactam was heated under nitrogen to 140°–150° C. in admixture with various quantities of a styrene/butadiene two-block copolymer (40% by weight styrene, including 32% in the block, 60% by weight butadiene; M$_n \simeq$210,000 g/mol$^{-1}$) and stirred until the block copolymer had dissolved. The viscosity values were then measured at various temperatures using a viscosimeter (Haake Viskotester). The dissolving times and viscosity values are shown in Table 1.

TABLE 1

| Ex. | Quantity of thickener[1] (% by weight) | t[2] (h) | $\eta$[3] (mPa·s) at 135 | 120 | 110° C. |
|---|---|---|---|---|---|
| 1 | 5 | 1 | 30—60 | 30–60 | 60 |
| 2 | 6 | — | 90 | 60–90 | 60–90 |
| 3 | 7 | — | 240 | 210 | 210 |
| 4 | 10 | — | >1000 | — | — |

[1] based on mixture
[2] dissolving time
[3] approx. 20–30 s$^{-1}$ shear rate

Example 5

7 g of the block copolymer used in Examples 1–4 were dissolved in 90.2 g caprolactam with stirring over a period of 30 minutes at 140° to 150° C. The highly viscous solution was then heated to 180° C. and 2 g sodium caprolactamate solution (20% in caprolactam) and 0.8 g of an aliphatic polyisocyanate solution (KU 2-8107, a product of Bayer AG) were added. The polymerization began after the usual time of about 30 seconds, as would have been the case even if the block copolymer had not been added. The case polyamide is crosslinked; the extract content (H$_2$O, 24 h) is 3.5%.

Examples 6 to 9

Caprolactam, the block copolymer used in the preceding Examples and glass fibers (15% by weight) were heated under nitrogen and homogenized with stirring for 30 minutes at 140° to 150° C. to form of a viscous lactam melt containing glass fibers. The viscosity values are shown in Table 2.

TABLE 2

| Ex. | Quantity of thickener[1] (% by weight) | $\eta$ (mPa·s) at 110 | 120 | 135 | 165° C. |
|---|---|---|---|---|---|
| 6 | 5 | — | 60 | 60 | — |
| 7 | 5.75 | 90 | 90 | 90 | — |
| 8 | 6.3 | 180 | 180 | 240 | — |
| 9 | 6.5 | 300–330 | 300 | 390 | — |
| 10 | 6.3 | 180 | 200 | 240 | 330 |

[1] based on mixture; all samples contained 15% by weight chopped strands

Example 10

After the viscosity measurement at 110° C., the lactam mixture of Example 8 was heated and its viscosity was remeasured after cooling. The lactam melt showed a pronounced viscosity/temperature anomaly.

Examples 11 to 14

Two caprolactam solutions a and b were prepared.
a: 13 g of the same block copolymer were dissolved in 183.8 g caprolactam at 150° C., cooled to 130° C. and 3.2 g of the activator solution of Example 5 were added.
b: 13 g block copolymer were dissolved in 179.0 g caprolactam at 150° C., cooled to 130° C. and 8 g of the catalyst solution of Example 5 were added.

50 g samples of a and b were then taken at various times during the storage of a and b at 130° C. and, after mixing, were polymerized in the usual way at 180° C. The conditioning times, the polymerization times, the extract contents and the viscosities are shown in Table 3.

TABLE 3

| Ex. | Conditioning time at 130° C. (h) | Polym. time[1] (mins.) | Extract[2] (%) | $\eta_{rel}$[3] |
|---|---|---|---|---|
| 11 | 0 | 6 | 5.8 | Crossl. |
| 12 | 4 | 8 | 6.5 | Crossl. |
| 13 | 8 | 9 | 5.7 | Crossl. |
| 14 | 16 | 11 | 6.5 | Crossl. |

[1] Time to onset of polymerization
[2] H$_2$O, 24 h
[3] Relative viscosity, 1% in m-cresol, 25° C.
Crossl. = crosslinked The reduction in polymerizability is within the normal limits.

Examples 15 and 16

Two melts were prepared without and with 15% by weight chopped strands.
c: 24.5 g of the same block copolymer were dissolved in 311.5 g caprolactam with stirring at 150° C. (30 minutes), the solution was cooled to 125° C. and 14 g of the same catalyst and, in one case, another 62 g glass fibers were added.
d: Solutions of 24.5 g block copolymer in 319.9 g caprolactam, 5.6 g activator solution and, in one case, another 62 g chopped strands were prepared in the same way.

The solutions were mixed in a 2-liter glass beaker and polymerized at 180° C.

Homogeneous, glossy blocks were obtained; the mixtures containing glass fibers produced good, uniform dispersion of the glass fibers.

Examples 17 to 20

In a flask, 234.3 g $\epsilon$-caprolactam were melted and homogenized under nitrogen at 140° to 150° C. with various quantities of a polybutadiene oil (45% vinyl, 55% cis-, trans-1,4-; ($\overline{M}_n$~4,500 g/mol). Quantities of 15.75 g of a styrene/butadiene two-block copolymer (40% by weight styrene, 32% in the block; 60% by weight butadiene; $\overline{M}_w$~210,000 g/mol) were then added and dissolved by stirring.

The viscosity values are shown in Table 4.

Examples 21 to 23

Lactam melts containing as component 2) various quantities of a polybutadienediol (20% vinyl, 20% cis- and 60% trans-1,4-; (Aldrich 19 079-9) and 6.3% by weight of the two-block copolymer of the preceding Examples were prepared in the same way as described for Examples 17 to 20.

The viscosity data are again shown in Table 4.

Examples 24 and 25

Lactam melts containing as component 2) a phenyl-terminated polybutadiene (45% vinyl, 10% trans- and 5% cis-1,4-content; total content of double bonds 60%; $\overline{M}_n$~1,800 g/mol; Aldrich 20,043-3) and 6.3% by weight of the two-block copolymer 1) were prepared in the same way.

The viscosity values are shown in Table 4.

Example 26

2.5 g of a polybutadiene (20% cis-, 60% trans-1,4, 20% vinyl; T$_G$=−95° C.; Aldrich 18,138-2) were used in the same way as component 2). The polybutadiene was not completely dissolved.

The viscosity values are shown in Table 5.

Example 27 to 29

A predominantly cis-1,4-polybutadiene (Adrich 18,137-4; $\overline{M}_n \sim 200$ to 300,000 g/mol) was used in the same way as component 2). It was not completely dissolved.

The viscosity values are shown in Table 5.

Examples 30 and 31

Two different oils of the type typically used for the production of oil-filled cast polyamide were used in the same way as component 2).

The viscosity values are shown in Table 5.

The oils were Marlotherm S ® (a product of Hüls AG) and Caloran 32 ® (A product of Fina).

TABLE 4

| | Example | | | | | | | | |
|---|---|---|---|---|---|---|---|---|---|
| | 17 | 18 | 19 | 20 | 21 | 22 | 23 | 24 | 25 |
| Quantity of two-block copolymer B) [%] | ← 6.3 → | | | | | | | | |
| Quantity[1]) of compoent C) [%] | 1 | 2 | 5 | 10 | 1 | 2 | 5 | 1 | 2 |
| Viscosity $\eta$ [mPa · s] at T [C.] | | | | | | | | | |
| 170 | — | — | — | — | — | — | 900 | 900 | 810 |
| 160 | 600 | 750 | 870 | 1800 | 450 | 510 | 870 | 780 | 750 |
| 150 | — | — | — | — | — | 480 | 750 | — | 690 |
| 140 | — | — | — | — | — | — | 690 | 630 | 630 |
| 135 | 540 | 720 | 840 | 1530 | 300 | 390 | — | — | — |
| 130 | — | — | — | — | — | — | 675 | 540 | 540 |
| 120 | 480 | 720 | 840 | 1500 | 270 | 390 | 675 | 510 | 510 |
| 110 | 450 | 660 | 840 | 1440 | 270 | 360 | 705 | 480 | 480 |
| 100 | — | — | — | — | 285 | — | 735 | 480 | 510 |
| 90 | — | — | — | — | 330 | — | 810 | 510 | 540 |

[1])Based on caprolactam + B)

TABLE 5

| | Example | | | | | |
|---|---|---|---|---|---|---|
| | 26 | 27 | 28 | 29 | 30 | 31 |
| Quantity of two-block copolymer A) [%] | ← 6.3 → | | | | | |
| Quantity of component B) [%][1]) | 1 | 1 | 1 | 0.5 | 4 | 4 |
| Oil | — | — | — | — | Marlotherm | Caloran |
| $\eta$ [mPa · s] at T [°C.][2]) | | | | | | |
| 170 | — | 960 | 3360 | — | 660 | 600 |
| 160 | 1020 | 810 | 2550 | 720 | 600 | 570 |
| 150 | 1020 | 750 | 2100 | 660 | 600 | 480 |
| 140 | 780 | 660 | 1740 | 570 | 480 | 420 |
| 130 | 450 | 600 | 1440 | 450 | 420 | 390 |
| 120 | 360 | 548 | 1380 | 450 | 360 | 360 |
| 110 | — | 488 | 930 | 420 | 360 | 360 |
| 100 | — | 473 | — | 420 | 330 | 390 |
| 90 | — | — | — | 340 | 360 | 390 |

[1])Based on caprolactam + B)
[2])Low rotational speed; shear rate approx. 5 to 10 s$^{-1}$

Examples 32 and 33

Solutions of the same block copolymers B) and, in addition, a silicone oil (C) (Silikonöl P 300, a product of BAYER AG) in caprolactam were prepared in the same way as described in the preceding Examples. The dissolving time was 1 h/140° C. and then 15 mins./150° C.

The viscosity data are shown in Table 6. Viscosity was measured with a Haake type VT 500 rotational viscosimeter.

TABLE 6

| Two-block copolymer 6.2% B) | $\eta$ [mPa · s] at Shear rate [s$^{-1}$] | | | | |
|---|---|---|---|---|---|
| Temperature [C.] | 50 | 18 | 6.45 | 4.53 | 2.32 |
| 170 | 430 | 870 | 1910 | 2530 | 4250 |
| 160 | 336 | 650 | 1280 | 1560 | 2490 |
| 150 | 300 | 560 | 1050 | 1370 | 2000 |
| 140 | 275 | 434 | 706 | 823 | 1040 |
| 130 | 225 | 353 | 550 | 590 | 680 |
| + 2 % silicone oil[1]) | | | | | |
| 170 | 500 | 1050 | 2300 | 3100 | 5250 |
| 160 | 397 | 780 | 1600 | 2070 | 3330 |
| 150 | 368 | 684 | 1340 | 1700 | 2630 |
| 140 | 340 | 650 | 1230 | 1500 | 2300 |
| 130 | 315 | 550 | 950 | 1200 | 1700 |

[1])Based on caprolactam block copolymer B)

Example 34

A mixture of 283.5 g caprolactam, 16.5 g (5.5% by weight) of the two-block copolymer and 53 g chopped strands was prepared as described in the preceding Examples. The dissolving conditions corresponded to those of Examples 32 and 33.

The viscosity data (Haake VT 500) are shown in Table 7.

TABLE 7

| | $\eta$ [mPa · s] at $\gamma$ [s$^{-1}$] | | | | |
|---|---|---|---|---|---|
| Temperature [° C.] | 50 | 18 | 6.45 | 4.53 | 2.32 |
| 170 | 258 | 480 | 990 | 1250 | 2000 |
| 160 | 233 | 20 | 820 | 1030 | 1700 |
| 150 | 204 | 343 | 653 | 870 | 1500 |
| 140 | 196 | 270 | 620 | 820 | 1400 |
| 130 | 194 | 310 | 618 | 810 | 1300 |

Example 35

A branched styrene/butadiene block copolymer (Cariflex ® TR 1184; a product of SHELL) containing approx. 30% by weight styrene was used in a quantity of 10% by weight as the block copolymer B) (dissolving conditions: 5 h/150° C.). The viscosity values were 225 mPa.s (170° C.), 120 mPa.s (160° C.), 75 mPa.s (150° C.) and 60 mPa.s (140° C.).

Example 36

10% by weight of a styrene/butadiene multiblock copolymer (Stereon ® 840, a product of FIRESTONE; 43% by weight styrene) were dissolved in caprolactam (3.5 h/140° C.). The viscosity values were 45 mPa.s. (170° C.), 60 mPa.s (160° C.), 75 mPa.s (150° C.) and 90 mPa.s (140° C.).

Comparison Example

5% by weight of a statistical styrene/butadiene copolymer (45% styrene, Aldrich 18,290-7) was insoluble in caprolactam at 160° C.

We claim:

1. Lactam mixtures having increased melt viscosity, said mixtures containing

A) single ring cyclic amides wherein said ring consists of 6 to 12 carbon atoms and a nitrogen atom,
B) 1 to 15% by weight unsaturated aromatic vinyl compound/diene block copolymers (B) containing 10 to 85% by weight aromatic vinyl units and 15 to 90% by weight diene units, the block copolymers (B) optionally being subsequently modified and optionally being present in dissolved form, and optionally
C) 0 to 20% by weight, based on (A+B), of aliphatic and aromatic hydrocarbons which are compatible with the block copolymers (B) and
D) 0 to 50% by weight, based on (A+B+C), of at least one substance selected from the group consisting of fillers, reinforcing materials and additives.

2. Lactam mixtures as claimed in claim 1, wherein monomers for the aromatic vinyl units in the aromatic vinyl compound/diene block copolymers comprise at least one monomer selected from the group consisting of styrene, α-methyl styrene, m- and p-methyl styrene (or the mixture thereof known as "vinyl toluene") and 2- and 4-vinyl pyridine while monomers for the synthesis of the diene units comprise at least one monomer selected from the group consisting of butadiene, isoprene and 2,3-dimethyl butadiene.

3. Lactam mixtures as claimed in claim 1, wherein the block copolymers (B) used are A'B' two-block copolymers, A'B'A' or B'A'B' three-block copolymers, (A'B')$_n$ multiblock copolymers and others, A' and B' representing the blocks in the block copolymers (B).

4. Lactam mixtures as claimed in claim 1, containing as component C) at least one of low molecular weight and high molecular weight substances which are homogeneously miscible with or form homogeneous mixtures or solutions with polydienes.

5. Lactam mixtures as claimed in claim 1, wherein said cyclic amides consist essentially of at least one of ε-caprolactam and ω-lauric lactam, optionally in combination with other single ring cyclic amides wherein said ring consists of 6 to 12 carbon atoms and a nitrogen atom.

6. Lactam mixtures as claimed in claim 1, wherein soft segments or elastomers are present in addition to the cyclic amides.

7. Lactam mixtures as claimed in claim 1, wherein at least one of said fillers and reinforcing materials are present and the total amount of said fillers and reinforcing materials, based on (A+B+C), is 5 to 50% by weight.

8. Lactam mixtures as claimed in claim 1, wherein said unsaturated aromatic vinyl compound/diene block copolymers (B) are present in an amount of 3–12% by weight.

9. Lactam mixtures as claimed in claim 8, wherein said unsaturated aromatic vinyl compound/diene block copolymers (B) are present in an amount of 4–10% by weight.

10. Lactam mixtures as claimed in claim 1, wherein said unsaturated aromatic vinyl compound/diene block copolymers (B) contain 20–80% by weight of said aromatic vinyl units.

11. Lactam mixtures as claimed in claim 10, wherein said unsaturated aromatic vinyl compound/diene block copolymers (B) contain 30–55% by weight of said aromatic vinyl units.

12. Lactam mixtures as claimed in claim 1, wherein said unsaturated aromatic vinyl compound/diene block copolymers (B) contain 20–80% by weight of said diene units.

13. Lactam mixtures as claimed in claim 12, wherein said unsaturated aromatic vinyl compound/diene block copolymers (B) contain 45–70% by weight of said diene units.

14. Lactam mixtures as claimed in claim 1, wherein said unsaturated aromatic vinyl compound/diene block copolymers (B) have been modified by at least one technique selected from the group consisting of: 1) partial hydrogenation of soft segments up to a degree of hydrogenation of 60%; 2) epoxidation; and 3) grafting with reactive monomers.

15. Lactam mixtures as claimed in claim 1, wherein said aliphatic and aromatic hydrocarbons which are compatible with the block copolymers (B) comprise at least one substance selected from the group consisting of: polybutadiene oils; hydroxyl- and phenyl-terminated polybutadiene oils; polyethylene waxes; poly-α-olefin oils; polyisoprene oils; polyoctylene oils; mineral oils or lubricants based on aliphatic, aromatic or cycloaliphatic hydrocarbons; polyethers soluble in mineral oils; alkyl-modified polyethers; silicone oils; ligroins; natural waxes and synthetic waxes.

16. Lactam mixtures as claimed in claim 1, wherein said fillers and reinforcing materials comprise at least one substance selected from the group consisting of glass fibers, glass beads, mineral fillers, carbon fibers and aramide fibers, and further wherein said fillers and reinforcing materials are, optionally, coated with at least one material, and said additives comprise at least one substance selected from the group consisting of mold release agents, UV stabilizers, antioxidants, lubricants and polymeric blending components.

17. Lactam mixtures as claimed in claim 3, wherein the block copolymers (B) have at least one of the following characteristics: 1) a star-like structure; 2) branched individual blocks; 3) mixed blocks (tapered or overlap structures); and 4) chemically modified diene blocks.

18. Lactam mixtures as claimed in claim 3, wherein the block copolymers (B) comprise at least one block copolymer selected from the group consisting at least one block copolymer selected from the group consisting of: styrene/butadiene two-block copolymers; styrene/isoprene two block copolymers; styrene/butadiene/styrene three-block copolymers; styrene/isoprene/styrene three-block copolymers; styrene/butadiene multiblock copolymers; styrene/isoprene multiblock copolymers; maleic anhydride-grafted (or carboxylated), partly hydrogenated or non-hydrogenated styrene/butadiene/styrene three-block copolymers; and epoxidized styrene/butadiene/styrene three-block copolymers.

19. Lactam mixtures as claimed in claim 4, wherein said substances have an average molecular weight of at least 200 g/mol, and where the substances are volatile, boiling points of at least 200° C., further wherein said substances have melting/softening points that are not higher than 150° C.

20. Lactam mixtures as claimed in claim 5, wherein said other cyclic amides comprise 107-lauric lactam.

* * * * *

UNITED STATES PATENT AND TRADEMARK OFFICE
CERTIFICATE OF CORRECTION

PATENT NO. : 5,264,479

DATED : November 23, 1993

INVENTOR(S) : Heinz Et Al

It is certified that error appears in the above-identified patent and that said Letters Patent is hereby corrected as shown below:

On the cover page in section (75), please add --Bernd Stollfuss, Bergisch Gladba, Fed. Rep. of Germany as an Inventor.

Column 12, claim 18, lines 44 and 45, the words "at least one block copolymer selected from the group consisting" should be deleted.

Column 12, claim 20, line 64 the word "107-lauric" should be --ω-lauric--.

Signed and Sealed this

Twenty-eighth Day of June, 1994

Attest:

BRUCE LEHMAN

*Attesting Officer*   *Commissioner of Patents and Trademarks*